US008998441B2

(12) United States Patent
Kim

(10) Patent No.: US 8,998,441 B2
(45) Date of Patent: Apr. 7, 2015

(54) LED LIGHTING MODULE AND LIGHTING DEVICE USING THE MODULE

(75) Inventor: Duk-Yong Kim, Youngin-si (KR)

(73) Assignee: K. M. W. Inc. (KR)

( * ) Notice: Subject to any disclaimer, the term of this patent is extended or adjusted under 35 U.S.C. 154(b) by 842 days.

(21) Appl. No.: 12/979,466

(22) Filed: Dec. 28, 2010

(65) Prior Publication Data

US 2012/0146512 A1 Jun. 14, 2012

(30) Foreign Application Priority Data

Dec. 14, 2010 (KR) ........................ 10-2010-0127730
Dec. 27, 2010 (KR) ........................ 10-2010-0135181

(51) Int. Cl.

| | |
|---|---|
| ***F21V 7/20*** | (2006.01) |
| ***F21V 29/00*** | (2006.01) |
| ***B60Q 1/06*** | (2006.01) |
| ***F21V 7/00*** | (2006.01) |
| *F21Y 101/02* | (2006.01) |
| *F21W 131/103* | (2006.01) |
| *F21Y 111/00* | (2006.01) |

(52) U.S. Cl.
CPC ........... *F21V 7/0025* (2013.01); *F21V 29/2212* (2013.01); *F21V 29/004* (2013.01); *F21V 29/225* (2013.01); *F21Y 2101/02* (2013.01); *F21W 2131/103* (2013.01); *F21V 7/005* (2013.01); *F21Y 2111/004* (2013.01)

(58) Field of Classification Search
CPC F21V 29/2243; F21V 29/225; F21V 29/2256
USPC ............... 362/218, 225, 249.01, 249.02, 235, 362/294, 367, 373; 315/115; 165/177–184, 165/80.1–80.3
See application file for complete search history.

(56) References Cited

U.S. PATENT DOCUMENTS

| | | | | |
|---|---|---|---|---|
| 7,202,789 | B1 * | 4/2007 | Stilp | 340/572.1 |
| 7,224,394 | B2 * | 5/2007 | Shimamura | 348/335 |
| 7,513,639 | B2 * | 4/2009 | Wang | 362/218 |
| 7,637,638 | B2 * | 12/2009 | Chen | 362/294 |
| 7,766,513 | B2 * | 8/2010 | Zhang et al. | 362/294 |
| 7,857,486 | B2 * | 12/2010 | Long et al. | 362/294 |
| 7,878,683 | B2 * | 2/2011 | Logan et al. | 362/249.02 |
| 7,891,845 | B2 * | 2/2011 | Zhang et al. | 362/294 |
| 7,918,580 | B2 * | 4/2011 | Liu | 362/218 |
| 7,926,982 | B2 * | 4/2011 | Liu | 362/294 |
| 8,033,686 | B2 * | 10/2011 | Recker et al. | 362/249.02 |

(Continued)

FOREIGN PATENT DOCUMENTS

JP 3163002 U 9/2010

*Primary Examiner* — Robert May
*Assistant Examiner* — Alexander Garlen
(74) *Attorney, Agent, or Firm* — Leydig, Voit & Mayer, Ltd.

(57) ABSTRACT

Provided are an LED light-emitting module and an illumination apparatus using the same. The LED light-emitting module includes a body frame having a light emitting opening in a direction inclined with respect to a ground surface and a coupling surface to which an LED package is coupled, the body frame including reflective plates extending from opposite sides of the coupling surface to define the light emitting opening, a plurality of heat radiating fins placed on the entire surface of the body frame except for the light emitting opening, and a plurality of LED packages installed on the coupling surface of the body frame such that light radiation angles of the LED packages are adjusted according to an angle by which the coupling surface is bent.

22 Claims, 7 Drawing Sheets

(56) References Cited

U.S. PATENT DOCUMENTS

| | | | | |
|---|---|---|---|---|
| 8,052,300 | B2 * | 11/2011 | Zhang et al. | 362/249.02 |
| 8,235,550 | B2 * | 8/2012 | Kong et al. | 362/249.02 |
| 8,322,893 | B2 * | 12/2012 | Nezu | 362/297 |
| 2007/0070628 | A1 * | 3/2007 | Chen | 362/249 |
| 2008/0205054 | A1 * | 8/2008 | Ho | 362/235 |
| 2009/0073692 | A1 * | 3/2009 | Berger et al. | 362/249.02 |
| 2009/0190350 | A1 * | 7/2009 | Tseng et al. | 362/249.01 |
| 2010/0027269 | A1 * | 2/2010 | Lo et al. | 362/294 |
| 2011/0058367 | A1 | 3/2011 | Shiau et al. | |
| 2012/0218757 | A1 * | 8/2012 | Gill | 362/235 |

* cited by examiner

LED LIGHTING MODULE AND LIGHTING DEVICE USING THE MODULE

BACKGROUND OF THE INVENTION

1. Field of the Invention

The present invention relates to an LED light-emitting module and an illumination apparatus using the same, and more particularly, to an LED light-emitting module with excellent heat radiating characteristics whose light radiation angle can be easily adjusted, and an illumination apparatus using the same.

2. Description of the Related Art

In recent years, LEDs are being studied as an illumination unit due to their low power consumption and long lifespan as compared with general light sources. As heat generated in LED packages shortens the lifespan, structures for smoothly radiating the heat of the LED packages are also being widely studied and developed.

In particular, while it is required to enhance the heat radiating characteristics of an LED street lamp employing a plurality of LED packages, there is a limit in enhancing smooth heat radiating characteristics with a structure in which heat radiating fins are provided on the rear surface of a printed circuit board (PCB) having a plurality of LED packages. In spite of many efforts to enhance heat radiating characteristics by increasing the number and height of heat radiating fins, there is also a limit in improving heat radiating characteristics as air cannot be convected in spaces between the heat radiating fins.

Japanese Utility Model No. 3163002 (hereinafter, the conventional technology) discloses an example of a structure for preventing lowering of heat radiating efficiency due to an increase in the height of heat radiating fins toward the rear side of a mounting surface of an light emitting diode (LED) used as an illumination means.

The conventional technology discloses an improved illumination apparatus adapted to smoothly emit heat due to air introduced between high heat radiating fins by crossing heat radiating fins of different shapes and heights toward the rear side of a mounting surface of an LED.

However, as it is relatively difficult to manufacture heat radiating fins of different heights, and there is a need to process groove patterns for easy flow of air in a central upper side of the heat radiating fins, manufacturing costs increase and productivity decreases.

Moreover, in the conventional technology, while a housing protrudes from a side of the LED mounting surface contacting a board to which LED chips are mounted, toward a lower side and some of the heat radiating fins are placed outside the protruding portion, the heat radiating fins on the side have an area remarkably small as compared with the area of the heat radiating fins placed on the rear side of the LED mounting surface, resulting in a very small amount of radiated heat.

This is because, considering that heat radiating efficiency is basically proportional to the area of the heat radiating fins to a certain degree, heat radiating effect is low and heat is radiated mainly to the rear side of the LED mounting surface, resulting in lowering of heat radiating efficiency.

In addition, in the conventional technology, there exist portions of a frame except for an area of the heat radiating fins whose thicknesses are partially different from the other portions, in which case the lifespan of some of the LED chips becomes shortened due to partial non-uniformity of temperatures caused by differences between the thicknesses of the frame, resulting in a shortened lifespan of the entire LED light-emitting apparatus.

Meanwhile, as an LED package has a narrow light radiating angle as compared with a general light source of a different type lamp, a more complex mechanical structure is needed to comply with a minimal light radiation angle range of a street lamp which is also related to the height of the street lamp. However, it is not easy to design such a structure and without increasing manufacturing costs.

Moreover, required illumination intensities may be different according to the locations of LED street lamps. Thus, since there is a need to consider the number of LED packages in designing the conventional LED street lamp from the start of the design, additional designs and manufactures are required for illumination apparatuses of different illumination intensities.

Although the conventional technology can satisfy the illumination intensity issue when a plurality of illumination apparatuses are disposed in parallel, they respectively include a rotor for rotation, making their mechanisms for individually driving the rotors very complex and making it difficult to configure the mechanisms. Further, the outwardly protruding rotors contact a coupling plate, making it difficult to adjust their angles.

SUMMARY OF THE INVENTION

Accordingly, the present invention has been made to solve the above-mentioned problems occurring in the prior art, and the present invention provides an LED light-emitting module which prevents shortening of the lifespan of LED packages by enhancing heat radiating characteristics, and an illumination apparatus using the same.

The present invention also provides an LED light-emitting module whose radiation angles can be variously adjusted if necessary while the LED light-emitting module is employing the same frame by providing a structure adapted to easily adjust the installation directions of LED packages, and an illumination apparatus using the same The present invention further provides an illumination apparatus which is adapted to arbitrarily adjust a light radiation angle while flexibly coping with requirements for illumination intensities using an LED light-emitting module.

The present invention still provides an LED light-emitting module which is light and firm, and an illumination apparatus using the same.

The present invention yet provides an LED light-emitting module which has a shape suitable for a cylindrical illumination apparatus to easily manufacture the illumination apparatus, and an illumination apparatus using the same.

In accordance with an aspect of the present invention, there is provided an LED light-emitting module including: a body frame having a light emitting opening in a direction inclined with respect to a ground surface and a coupling surface to which an LED package is coupled, the body frame including reflective plates extending from opposite sides of the coupling surface to define the light emitting opening; a plurality of heat radiating fins placed on the entire surface of the body frame except for the light emitting opening; and a plurality of LED packages installed on the coupling surface of the body frame such that light radiation angles of the LED packages are adjusted according to an angle by which the coupling surface is bent.

In accordance with another aspect of the present invention, there is provided an illumination apparatus including: a pair of LED light-emitting modules each including a body frame having a light emitting opening in a direction inclined with respect to a ground surface and a coupling surface to which an LED package is coupled, the body frame including reflective plates extending from opposite sides of the coupling surface to define the light emitting opening; a plurality of heat radiating fins placed on the entire surface of the body frame except for the light emitting opening; and a plurality of LED packages installed on the coupling surface of the body frame such that light radiation angles of the LED packages are adjusted according to an angle by which the coupling surface is bent; and support frames configured to support and fix opposite ends of the LED light-emitting modules.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, LED light-emitting modules and illumination apparatuses according to embodiments of the present invention will be described in detail with reference to the accompanying drawings.

Figure 1:
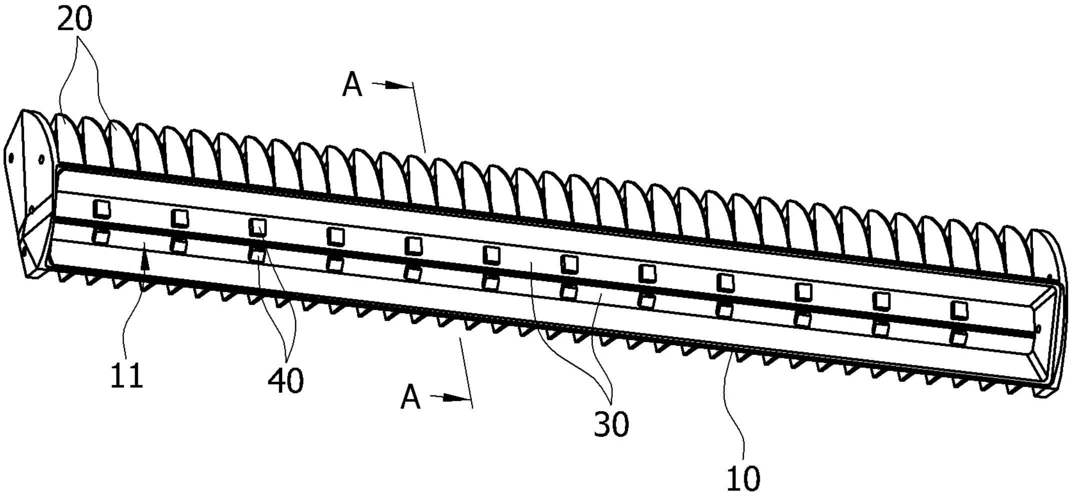
FIG. 1 is a bottom perspective view of an LED light-emitting module according to an embodiment of the present invention.
Figure 2:
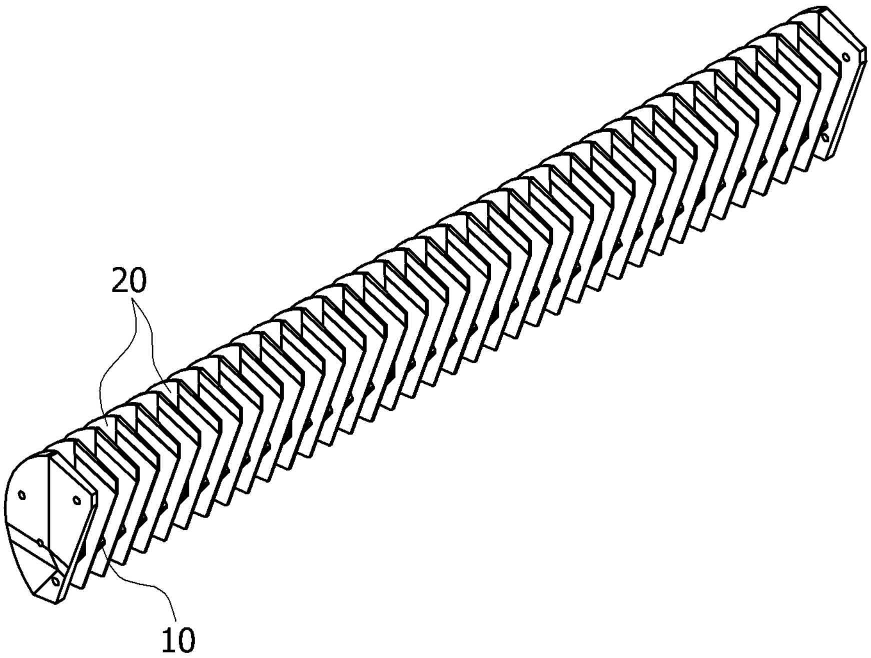
FIG. 2 is a top perspective view of FIG. 1.
Figure 3:
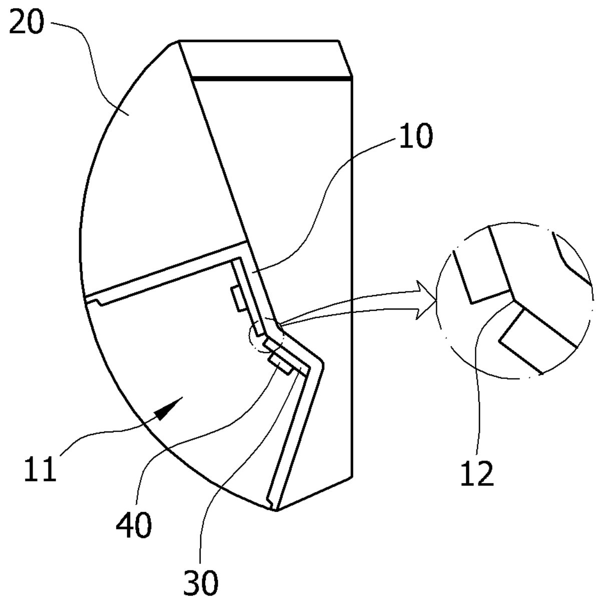
FIG. 3 is a sectional view taken along line A-A of FIG. 1.

FIG. 1 is a bottom perspective view of an LED light-emitting module according to an embodiment of the present invention. FIG. 2 is a top perspective view of FIG. 1. FIG. 3 is a sectional view taken along line A-A of FIG. 1.

Referring to FIGS. 1 to 3, an LED light-emitting module according to the embodiment of the present invention includes a body frame 10 having a light emitting opening 11 in a direction inclined with respect to a ground surface by a certain angle and a bent coupling surface 12, a plurality of semi-circular heat radiating fins 20 placed on the entire surface of the body frame 10 except for the heat emitting opening 11 so as to be spaced apart from each other, and metal PCBs 30 coupled to the coupling surface 12 of the body frame 10, and a plurality of LED packages 40 mounted to the metal PCBs and configured to emit light using power supplied through the metal PCBs 30.

Hereinafter, the configuration and operation of the LED light-emitting module according to the embodiment of the present invention will be described in detail.

First, the body frame 10 is made of a metal and has a bar shape which is long along one direction.

The light emitting opening 11 is formed long in a lengthwise direction of the body frame on the bottom surface of the body frame 10 and is inclined at a certain angle with respect to a ground surface. The coupling surface 12 is bent at an inner side of the heat emitting opening 11.

Figure 4:
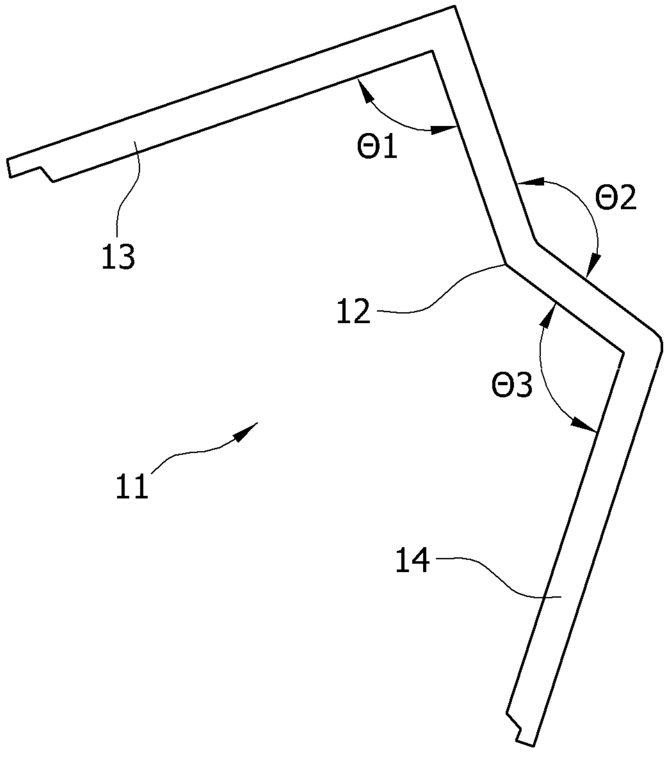
FIG. 4 is a sectional view of a body frame of FIG. 3.

That is, the cross-section of the body frame 10 is W-shaped. FIG. 4 is a sectional view of the body frame of FIG. 3.

Referring to FIG. 4, the body frame 10 is bent such that a central portion of the coupling surface 12 is high and peripheral portions thereof are low. In this case the bent portion of the body frame 10 is bent at a first angle θ1 so that various radiation angles can be realized through adjustment of the first angle θ1.

As described above, the central portion of the coupling surface 12 is bent such that the coupling surface 12 is divided into a pair of surfaces, and the metal PCBs 30 to which the LED packages 40 are mounted are fixed to the two surfaces respectively.

Reflective plates 13 and 14 extend from opposite sides of the coupling surface 12 respectively at a second angle θ2 and a third angle θ3 such that the radiation angle of the light emitted from the LED packages 40 is adjusted by adjusting the second angle θ2 and the third angle θ3 of the reflective plates 13 and 14.

While it is illustrated and described that the coupling surface has one bent portion in this example, a plurality of bent portions may be provided if necessary such that a plurality of inclined surfaces formed by the bent portions may be used as the coupling surfaces 12 of the metal PCBs 30.

As well known in the art, the metal PCBs 30 have an excellent thermal conductivity such that the heat generated by the LED packages 40 is directly transferred to the body frame 10, making it possible to radiate heat easily.

The entire body frame 10 has the same thickness such that the difference between heat transfer efficiencies due to the difference of its thickness is prevented, making it possible to prevent difference between temperatures at portions of the LED packages.

A plurality of heat radiating fins 20 are provided in the body frame 10. The feature of the heat radiating fins 20 is their shapes protruding from the upper and side surfaces of the body frame 10 except for the bottom surface of the body frame on which the heat emitting opening 11 is formed.

That is, the heat radiating fins 20 are placed on the outer sides of the reflective plates 13 and 14 as well as on the rear side of the coupling surface 12 of the body frame 10, and the area of the heat radiating fins 20 on the rear side of the coupling surface 12 is substantially the same as the area of the heat radiating fins 20 on the rear sides of the reflective plates 13 and 14 such that the radiated heat is not concentrated to a portion to achieve uniform heat radiating characteristics as a whole.

Referring again to FIG. 3, the LED packages 40 are placed at middle portions of the heat radiating fins 20. That is, the heat radiating fins 20 are placed on the upper and lower sides of the LED packages 40 such that heat is transferred in all directions to further enhance heat radiating characteristics.

Thus, when the height of the heat radiating fins 20 is low as compared with conventional technology, heat radiating areas are sufficiently secured, and air can be convected to contact the body frame 10 between the heat radiating fins 20 due to the height of the heat radiating fins 20.

This structure considers that in a conventional structure for securing heat radiating areas by increasing the height of the heat radiating fins, the convected air fails to contact bottom surfaces of the heat radiating fins due to an increase in their height, not causing an increase in heat radiating efficiency. That is, use of the heat radiating fins 20 having a uniform height makes the manufacturing process relatively easy and manufacturing costs low.

The entire weight of the LED light-emitting module can be reduced by lowering the height of the heat radiating fins 20 and is advantageous when it is applied to an illumination apparatus such as a street lamp which should consider influence of the wind.

The body frame 10 has a rectangular frame structure whose bottom surface is opened such that it is prevented from being deflected or distorted even when the thickness of the body frame 10 is reduced. Thus, the body structure 10 has a sufficient strength and is light weight as compared with a conventional LED street lamp.

The heat radiating fins 20 extend from the sides of the body frame 10 as well as from the upper surface of the body frame 10, preventing deformation of the body frame 10 and functioning to increase the strength of the body frame 10.

Figure 5:
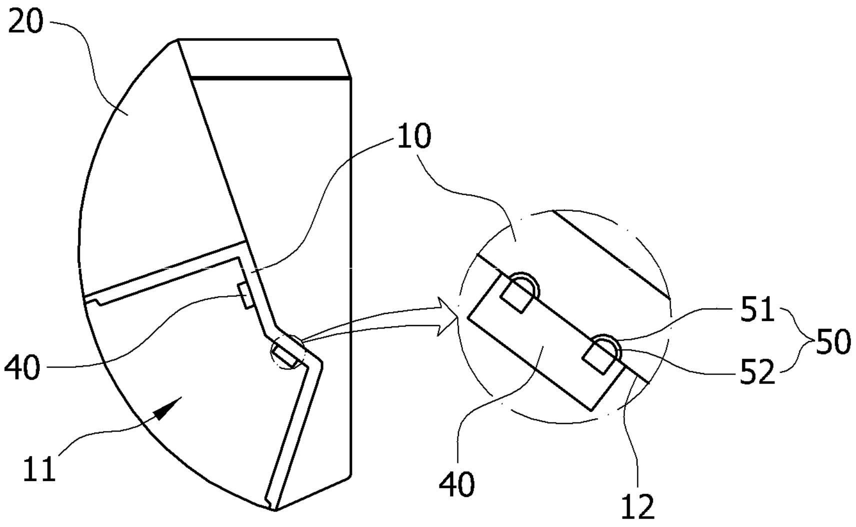
FIG. 5 is a sectional view of an LED light-emitting module according to another embodiment of the present invention.

FIG. 5 is a sectional view of an LED light-emitting module according to another embodiment of the present invention.

Referring to FIG. 5, the LED light-emitting module according to the embodiment of the present invention is adapted to further increase heat radiating efficiency as compared with the above-described embodiments of the present invention.

That is, wire portions 50 are inserted into the coupling surface 12 of the body frame 10 instead of the metal PCBs 30, and the LED packages 40 are bonded to the wire portions 50 such that the power terminals 41 of the LED packages 40 directly contacts the wire portions 50.

The wire portions 50 may have single core wires 52 insulated by insulating coatings 51, and the single core wires 52 are exposed by removing the insulating coatings 51 at contact portions of the power terminals 41 of the LED packages 40. The single core wires 52 exposed by removing the insulating coatings 51 are connected to the power terminals 41 of the LED packages 40 such that the LED packages 40 emit light using the power supplied to the power terminals 41 of the LED packages 40 from the outside.

Then, the LED packages 40 are attached to the coupling surfaces 12 of the body frame 10 such that the generated heat is directly radiated through the body frame 10 and the heat radiating fins 40, and thus heat radiating characteristics can be enhanced further.

Although FIG. 5 illustrates a pair of wire portions 50, when the body frame 10 itself is used as a wire, power can be supplied to the LED package 40 using one wire portion 50.

Figure 6:
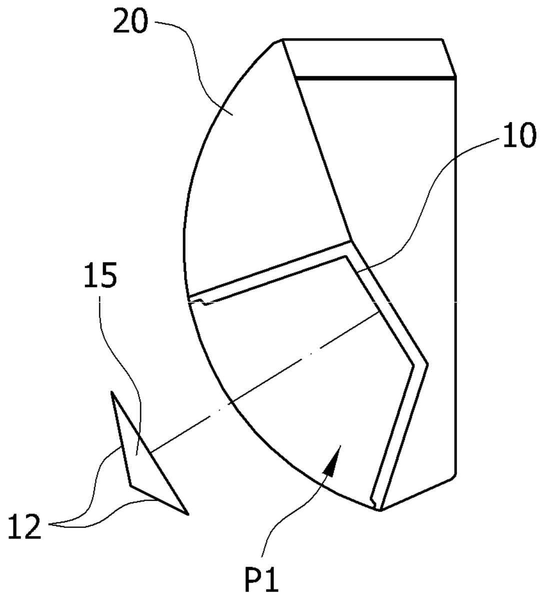
FIG. 6 is a sectional view of an LED light-emitting module according to another embodiment of the present invention with a portion being separated.

FIG. 6 is a sectional view of an LED light-emitting module according to another embodiment of the present invention with a part being separated.

Referring to FIG. 6, in the LED light-emitting module according to the embodiment of the present invention, a coupling portion 15 having the coupling surface 12 of the body frame 10 may be detachably mounted to the body frame 10. The body frame 10 and the heat radiating fins 20 provided on the entire body frame 10 are manufactured in standardized shapes, and various coupling portions 15 having different first bending angles θ1 at the coupling surface 12 are coupled to the body frame 10, making it possible to vary the light radiation angle of the LED packages 40.

Then, the coupling portion 15 may have a plurality of bent portions to increase the number of coupling surfaces 12.

According to the embodiment of the present invention, as the design of the body frame 10 does not need to be changed to vary the light radiation angle, an illumination apparatus having various light radiation angles may be provided using the same light-emitting module.

That is, while the body frame 10 and the heat radiating fins 20 have the same shapes, the coupling portion 15 can be variously manufactured to be exchanged if necessary, easily providing various light radiation angles as required.

Figure 7:
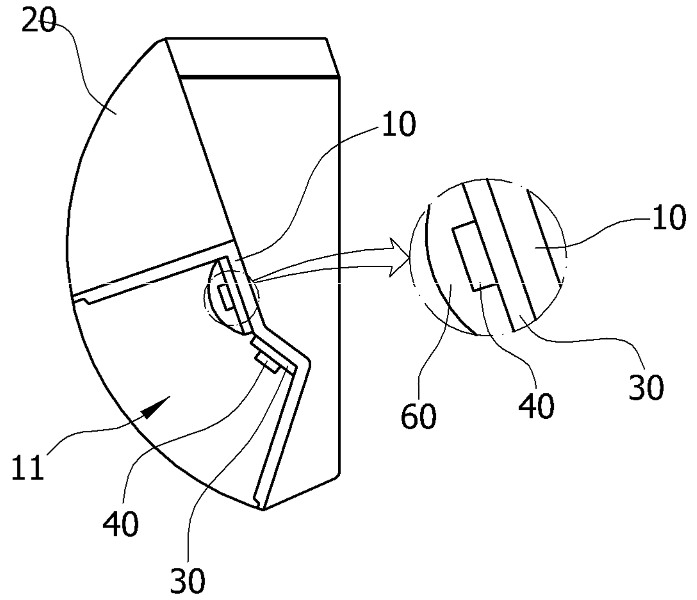
FIG. 7 is a sectional view of an LED light-emitting module according to another embodiment of the present invention.

FIG. 7 is a sectional view of an LED light-emitting module according to another embodiment of the present invention.

Referring to FIG. 7, in the LED light-emitting module according to the embodiment of the present invention, a bar-shaped lens portion 60 may be attached to upper portions of the LED packages 40.

The bar-shaped lens portion 60 may be directly attached to the coupling surface 12 or may be attached to the metal PCBs 30 to change the light radiation angle of the LED packages 40 and to protect the LED packages 40 and the metal PCBs 30 from outside moisture.

Thus, separate covers are not necessary and the thickness of the body frame 10 does not need to be thick to apply separate covers to the light emitting opening, which is advantageous being light weight and allows easy radiation of heat.

Although the bar-shaped lens portion 60 is attached to the plurality of LED packages 40 as an example, a plurality of lens portions may be individually applied to the LED packages 40 to achieve the same effect, and the radiation angle of the light emitted through the individual lens portions can be controlled respectively.

Figure 8:
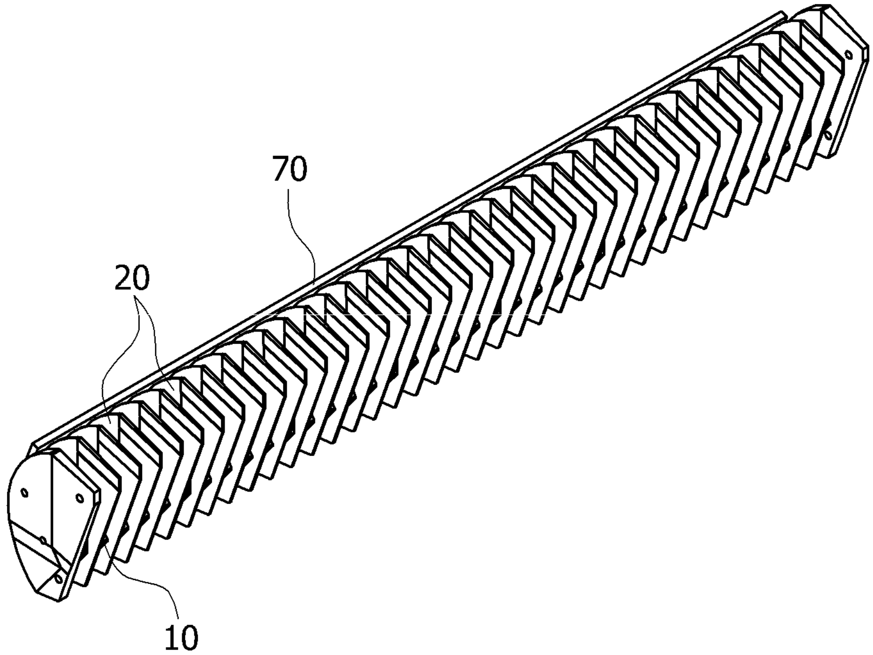
FIG. 8 is a perspective view of an LED light-emitting module according to another embodiment of the present invention.

FIG. 8 is a perspective view of an LED light-emitting module according to another embodiment of the present invention.

Referring to FIG. 8, the LED light-emitting module according to the present invention further includes a heat radiating plate 70 configured to mutually connect the heat radiating fins 20 in addition to the configuration of the LED light-emitting module of FIG. 2.

The heat radiating plate 70 has a curved- or planar plate-like structure which is long along one direction like the body frame 10. A space is formed between the heat radiating plate 70 and the body frame 10 due to the existence of the heat radiating fins 20, and air is convected through the space such that it contacts opposite sides of the heat radiating plate 70 to radiate heat.

For smooth convection between the space between the body frame 10 and the heat radiating plate 70, the heat radiating plate 70 is installed at curved portions of the heat radiating fins 20 of FIG. 3, whereby heat is smoothly radiated as the flow of air is not blocked. Thus, the heat radiation area is increased by the heat radiating plate 70, making it possible to achieve excellent heat radiating characteristics.

The heat radiating plate 70 also functions to make the temperatures of the heat radiating fins 20 uniform. That is, uniform temperature distribution in the entire module prevents generation of partial temperature deviations and shortening of the lifespan of the LED packages.

Figure 9:
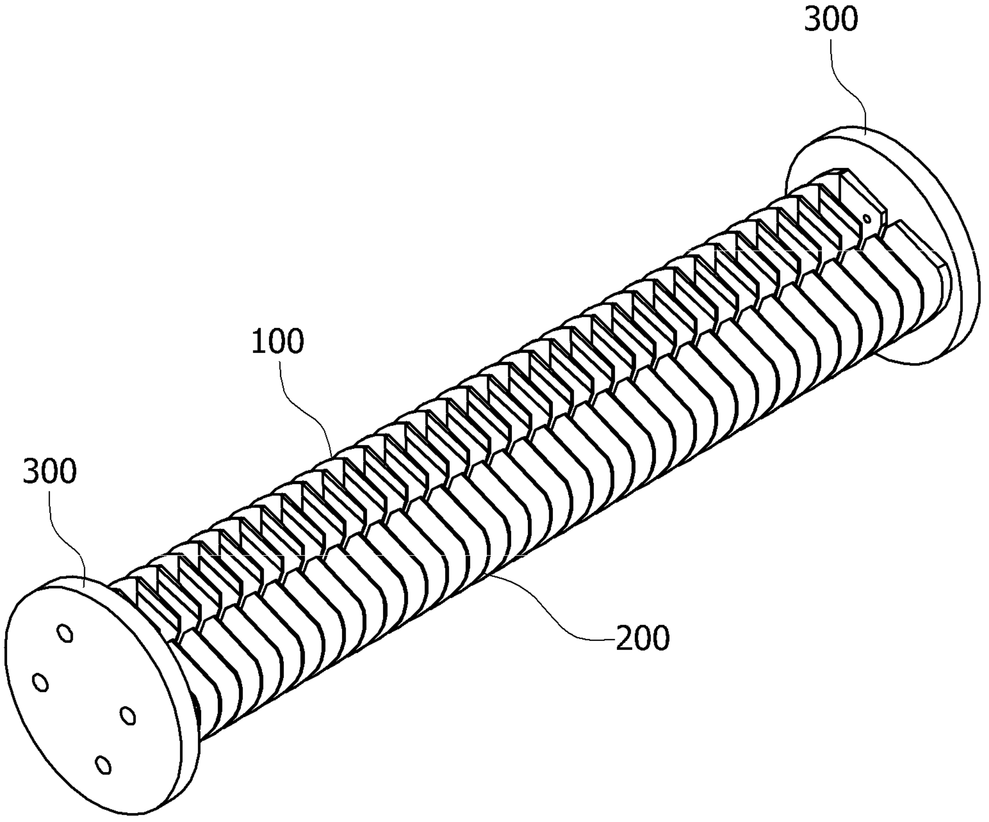
FIG. 9 is a perspective view illustrating an assembled state of an LED illumination apparatus using the LED light-emitting module of the present invention.

FIG. 9 is a perspective view illustrating an assembled state of an LED illumination apparatus using the LED light-emitting module of the present invention.

Referring to FIG. 9, in the LED illumination apparatus using the LED light-emitting module of the present invention, opposite ends of the body frames 10 of a pair of LED light-emitting modules 100 and 200 are fixed by circular plate support frames 300.

The LED modules 100 and 200 have semi-cylindrical shapes respectively to form a cylindrical shape when coupled with each other.

As the structure of the illumination apparatus formed by coupling the LED modules 100 and 200 is cylindrical, the shape of a case forming the appearance of the illumination unit is also cylindrical, making it possible to easily manufacture the illumination apparatus using the pair of LED modules 100 and 200.

As the body frames 10 of the LED modules 100 and 200 have the light emitting openings 11 in a direction inclined with respect to a ground surface, the light emitting openings 11 of the LED modules 100 and 200 face left and right directions with respect to a coupling portion between the LED modules 100 and 200.

Then, the light radiation angles of the LED modules 100 and 200 can be adjusted by the inclination angles of the bent coupling surface 12 and the angles of the reflective plates 13 and 14.

The heat radiating fins 20 of the LED modules 100 and 200 are fixed to the support frames 300 spaced apart from each other, and thus air can be convected between the LED modules 100 and 200 to contact the body frames 10 between the heat radiating fins 20, making it possible to radiate heat more smoothly.

All the LED light-emitting modules of FIGS. 1 to 3, 4, and 5 to 7 may be applied to the illumination apparatus of FIG. 9.

Although FIG. 9 illustrates the illumination apparatus using a pair of LED light-emitting modules, a plurality of LED light-emitting modules may be disposed in parallel to realize an illumination apparatus. Then, a pair of LED light-emitting modules form a unit body such that the illumination apparatus is realized using a plurality of unit bodies.

Figure 10:
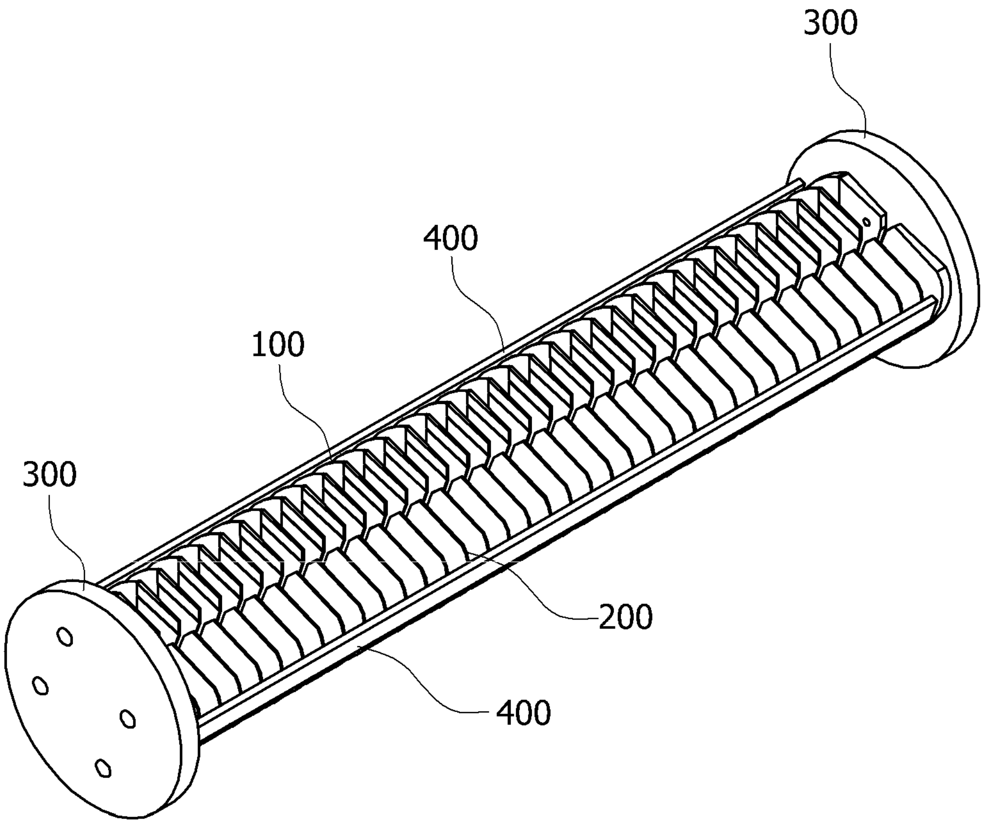
FIG. 10 is a perspective view illustrating another embodiment of an LED illumination apparatus using the LED light-emitting module of the present invention.

FIG. 10 is a perspective view illustrating another embodiment of an LED illumination apparatus using the LED light-emitting module of the present invention.

Referring to FIG. 10, in the illumination apparatus according to the embodiment of the present invention, two heat radiating plates 400 connecting the heat radiating fins are attached to curved portions of the heat radiating fins of the LED light-emitting modules 100 and 200 in a lengthwise direction of the LED light-emitting modules 100 and 200 in the illumination apparatus of FIG. 9.

The heat radiating plates 400 substantially expands the areas of the plurality of heat radiating fins provided in the LED modules 100 and 200, radiating heat more smoothly.

As the heat radiating fins are connected to each other, temperature deviations at certain locations of the heat radiating fins are prevented, and thus the temperatures of the heat radiating fins are uniform as a whole.

This structure is adapted to prevent a temperature difference between different portions to prevent the lifespan of the LED packages from being shortened in a region where temperature is high.

As described above, the LED light-emitting modules according to the present invention and the illumination apparatus using the modules increase heat radiating efficiency by radiating the heat generated in the LED packages directly to the metal body frame or through the metal PCB of high thermal conductivity and by varying the radiation directions of the heat. Further, an LED street lamp satisfying the requirements in radiation angles can be manufactured without changing designs through the modules.

Figure 11:
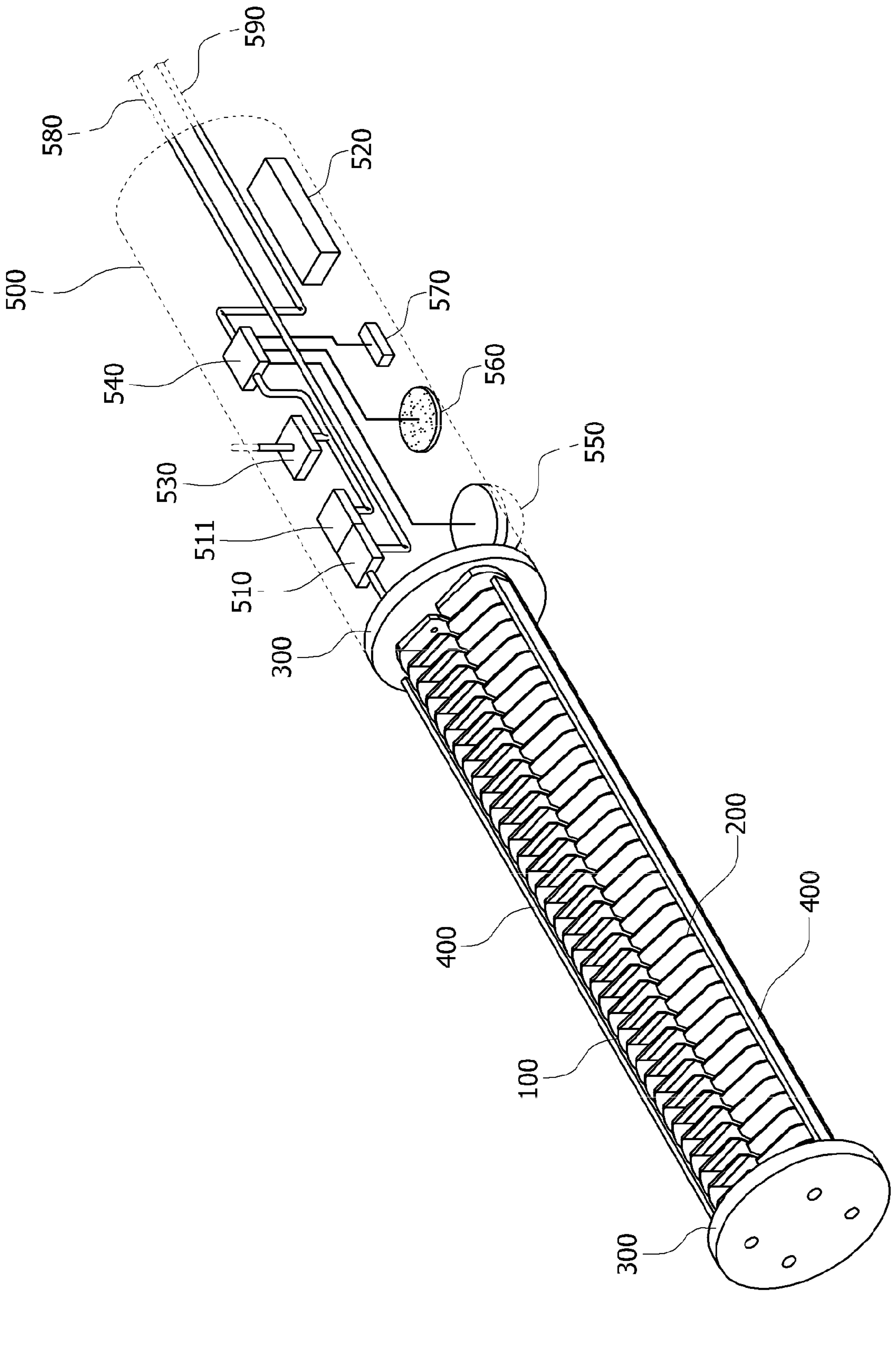
FIG. 11 is a perspective view illustrating another embodiment of an LED illumination apparatus using the LED light-emitting module of the present invention.

FIG. 11 is a perspective view illustrating another embodiment of an LED illumination apparatus using the LED light-emitting module of the present invention.

Referring to FIG. 11, the LED illumination apparatus using the LED light-emitting module of the present invention further includes a control unit 500 provided at one end of the illumination apparatus of FIG. 10.

The control unit 500 includes a power supply unit such that power supplied through a power line 580 can be stably supplied to the LED light-emitting modules 100 and 200. The supply of power is controlled by a lighting controller 511 controllable through a communication line 590 such that the LED light-emitting modules 100 and 200 can be turned on or off by the lighting controller 511.

When a plurality of illumination apparatuses using the LED light-emitting modules of the present invention are installed, all or some of the illumination apparatuses can be turned on or off at need.

The illumination apparatuses using the LED light-emitting modules of the present invention may be used as security lights or for a function of collecting and recognizing traffic situations in real time. The control unit 500 includes a camera 550, a speaker 560, and a microphone 570 for a security function or a traffic information collecting function, and can transmit images photographed by the camera 550 and sounds collected through the microphone 570 through the communication module 540, and output the voice or sound information received through the communication module 540 through the speaker 560. The control unit 500 informs a traffic control room of traffic control situations in real time and allows the traffic control room to guide necessary measures through the speaker 570.

Further, when a crime is captured by the camera 550, an alarm is generated through the speaker 570 to stop the crime, thus preventing crime.

An access point 530 of WIFI may be added to the control unit 500 to expand an Internet connected area of a wireless Internet terminal such as a smart phone or a laptop computer without providing any separate facility.

Moreover, the illumination apparatuses using the LED light-emitting modules of the present invention which can be used as street lamps may also be used for mobile communication relays without installing any separate mobile communication antenna by adding a mobile communication antenna 520.

Further, in the conventional technology, while a mobile communication antenna is installed on the rooftop of a building or a disguised antenna imitating natural objects is installed on a roadside, it spoils the appearance of the building and increases installation costs.

Such problems can all be solved by adding the mobile communication antenna 520 to the illumination apparatuses of the present invention which are placed roadside.

According to the LED light-emitting module of the present invention, heat can be easily radiated by bringing the LED packages into contact with a heat radiating plate directly or through a metal PCB of excellent thermal conductivity.

Further, the heat radiating characteristics of the LED light-emitting module can be enhanced by extending the heat radiating fins downward to the sides of the LED packages as well as to the rear surfaces thereof, and by making the area of the heat radiating fins on the sides of the LED package equal to the area of the heat radiating fins on the rear surface thereof.

Furthermore, heat can be smoothly radiated by smoothly convecting air using the heat radiating fins whose height is relatively low, making it possible to reduce the weight of the product and easily carry and keep the product.

In addition, the radiation angle of the LED light-emitting module of the present invention can be easily adjusted by changing the inclination angles of the inclined surfaces attached to the metal PCB to which the LED packages are mounted. In particular, its radiation angle can be variously selected by allowing the inclined surfaces to be detachable while a standardized body frame is used.

Meanwhile, according to the illumination apparatus using the LED light-emitting module of the present invention, a pair of LED light-emitting modules can be easily applied to the illumination apparatus having a cylindrical case by making the LED light-emitting modules supported by the support frames cylindrical.

Moreover, heat can be smoothly radiated by convecting air through a space between the spaced LED light-emitting modules when the LED light-emitting modules are supported by the support frames.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A light emitting diode (LED) light-emitting module comprising:

an elongate one-piece body frame having a substantially uniform thickness, a length along a longitudinal direction of the body frame, and, in an end view taken along the longitudinal direction of the body frame, a W shape, the body frame including generally planar first and second reflective plates, and a coupling portion interposed between, joined to, and coupling the first and second reflective plates to each other, wherein the coupling portion has an inside coupling surface between the first and second reflective plates, the first and second reflective plates have respective first and second inside surfaces that are contiguous to the inside coupling surface of the coupling portion, the first and second inside surfaces of the first and second reflective plates face each other, are oriented at respective first and second angles with respect to the inside coupling surface of the coupling portion, and define, between each other, and opposite the inside coupling surface of the coupling portion, a light-emitting opening of the body frame, the coupling portion includes first and second coupling parts that are contiguous, oblique to each other, and have respective inside surfaces that respectively face the first and second inside surfaces of the first and second reflective plates, the coupling portion includes an outside coupling surface opposite the inside coupling surface of the coupling portion, the first and second reflective plates include respective first and second outside surfaces opposite the respective first and second inside surfaces of the first and second reflective plates, and the first and second reflective plates diverge from each other along a direction extending from the inside coupling surface of the coupling portion toward the light-emitting opening;

a plurality of packaged LEDs respectively mounted on the first and second coupling parts of the coupling portion, on the inside coupling surface of the coupling portion; and a plurality of spaced apart heat radiating fins, wherein each heat radiating fin is mounted on the outside coupling surface of the coupling portion, and on the first and second outside surfaces of the first and second reflective plates, and each heat radiating fin is transverse to the longitudinal direction of the body frame.

2. The LED light-emitting module as claimed in claim 1, including metal printed circuit boards to which the packaged LEDs are mounted and which are fixed to the inside coupling surface.

3. The LED light-emitting module as claimed in claim 1, including power terminals connected to wire portions inserted into the inside coupling surface for supplying power to the packaged LEDs.

4. The LED light-emitting module as claimed in claim 3, wherein each wire portion includes a single core wire through which power is supplied, and an insulating coating insulating the single core wire, and the insulating coating is at least partially absent at connecting portions of the power terminals such that the single core wire is electrically connected to the power terminals.

5. The LED light-emitting module as claimed in claim 4, wherein the wire portions are provided in pairs connected to respective pairs of the power terminals of the packaged LEDs.

6. The LED light-emitting module as claimed in claim 4, wherein a first wire portion is connected to a first of first and second power terminals of the packaged LEDs and the second power terminal is connected to the body frame.

7. The LED light-emitting module as claimed in claim 1, wherein each of the heat radiating fins has a semi-circular plate shape when viewed along the longitudinal direction of the body frame.

8. The LED light-emitting module as claimed in claim 1, further comprising at least one lens attached to the packaged LEDs.

9. The LED light-emitting module as claimed in claim 8, wherein the at least one lens is a bar-shaped lens attached to the packaged LEDs or a plurality of lenses individually attached to the packaged LEDs.

10. The LED light-emitting module as claimed in claim 1, further comprising a heat radiating plate mutually connecting outer surfaces of the heat radiating fins together.

11. An illumination apparatus comprising:

a plurality of LED light-emitting modules as claimed in claim 1; and support frames coupled to opposite ends of the LED light-emitting modules, fixing and supporting the LED light-emitting modules in parallel to each other.

12. The illumination apparatus as claimed in claim 11, wherein a pair of the LED light-emitting modules defines a cylindrical shape.

13. The illumination apparatus as claimed in claim 11, wherein opposite ends of the LED light-emitting modules are fixed to the support frames and are spaced apart from each other.

14. The illumination apparatus as claimed in claim 11, wherein each of the heat radiating fins has a semi-circular plate shape when viewed along the longitudinal direction of the body frame of one of the LED light-emitting modules.

15. The illumination apparatus as claimed in claim 11, wherein each LED light-emitting module further comprises at least one lens attached to the packaged LEDs.

16. The illumination apparatus as claimed in claim 15, wherein the at least one lens is a bar-shaped lens attached to the packaged LEDs or a plurality of lenses individually attached to the packaged LEDs.

17. The illumination apparatus as claimed in claim 11, wherein each LED light-emitting module further comprises a heat radiating plate mutually connecting outer surfaces of heat radiating fins together.

18. The illumination apparatus as claimed in claim 11, comprising a control unit including a power supply unit supplying power to the LED light-emitting modules, a lighting controller controlling the power supplied to the LED light-emitting modules, an access point for a wireless Internet connection, and a camera located at one side of the support frames.

19. The illumination apparatus as claimed in claim 18, wherein the control unit further includes a mobile communication antenna, a communication module for communicating through the communication antenna, a microphone collecting peripheral sounds and transmitting the peripheral sounds collected through the communication module, and a speaker outputting a sound received through the communication module.

20. The illumination apparatus as claimed in claim 12, wherein each LED light-emitting module further comprises a heat radiating plate mutually connecting outer surfaces of heat radiating fins together.

21. The illumination apparatus as claimed in claim 13, wherein each LED light-emitting module further comprises a heat radiating plate mutually connecting outer surfaces of heat radiating fins together.

22. The illumination apparatus as claimed in claim 1, wherein each of the heat radiating fins includes a heat radiating surface transverse to the longitudinal direction of the body frame, and portions of the heat radiating surface respectively directly opposite the outside surfaces of the first reflective plate, the coupling portion, and the second reflective plate are substantially equal in area.

* * * * *